United States Patent [19]

Rabe et al.

[11] Patent Number: 4,818,160

[45] Date of Patent: Apr. 4, 1989

[54] MACHINING DEVICE WITH A TOOLHOLDER DISPLACEABLE IN THREE COORDINATES PERPENDICULAR TO ONE ANOTHER

[75] Inventors: Gerd Rabe, Meinerzhagen; Gerd Pollak, Gummersbach, both of Fed. Rep. of Germany

[73] Assignee: L. & C. Steinmuller GmbH, Gummersbach, Fed. Rep. of Germany

[21] Appl. No.: 54,956

[22] Filed: May 28, 1987

[30] Foreign Application Priority Data

Jun. 5, 1986 [DE] Fed. Rep. of Germany ....... 3619000

[51] Int. Cl.⁴ .............................................. B23C 1/06
[52] U.S. Cl. ................................. 409/202; 408/88; 409/211; 409/235
[58] Field of Search ................... 408/42, 38, 110, 234, 408/712, 88; 409/202, 235, 236, 178, 188, 190, 191, 211, 212; 29/26 A, 27 A; 269/60–62, 71–73, 219, 244; 33/1 M; 83/925 CC

[56] References Cited

U.S. PATENT DOCUMENTS

| | | | |
|---|---|---|---|
| 3,000,238 | 9/1961 | Maluf | 408/88 |
| 3,008,381 | 11/1961 | Jones | 408/234 |
| 3,650,178 | 3/1972 | Appleton | 409/202 |
| 4,022,106 | 5/1977 | Kile | 409/235 |
| 4,201,101 | 5/1980 | Gerber | 83/22 |
| 4,468,160 | 8/1984 | Campbell, Jr. | 409/202 |

FOREIGN PATENT DOCUMENTS 2552742 5/1977 Fed. Rep. of Germany.

Primary Examiner—Neil Abrams
Attorney, Agent, or Firm—Young & Thompson

[57] ABSTRACT

A machining device includes a toolholder (24) displaceable in three coordinates (X, Y, Z) perpendicular with respect to one another by means of three linear guides (23, 15, 28) and associated drives (25, 19, 30) on a frame of the device. The device is characterized in that the frame (1, 8) of the device is of an essentially U-shaped configuration and that the toolholder (24), retained in a shape-mating fashion, is displaceable on a carriage (23) extending transversely to the legs (1a, 8a; 1b, 8b) in the first coordinate direction (X) and the third coordinate direction (Z). This carriage, retained in a shape-mating fashion with its ends (22) on the legs (1a, 8a; 1b, 8b) of the frame, is displaceable along the legs in the second coordinate direction (Y). Preferably, the frame of the device consists of a U-shaped supporting stand (1) and of a rotary stand (8) having a U-shape and being swivelable thereon, the toolholder (24) being displaceable on the rotary stand in the three coordinate directions.

11 Claims, 3 Drawing Sheets

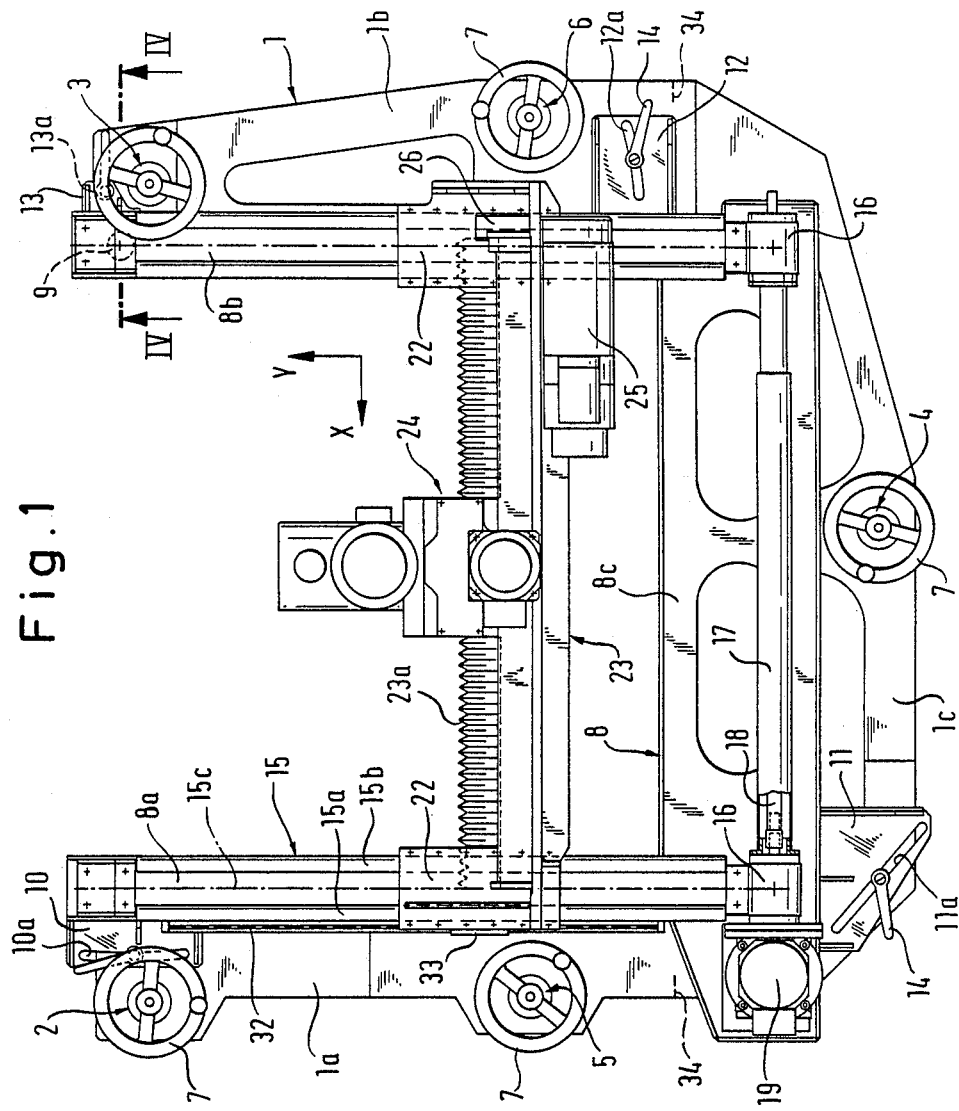

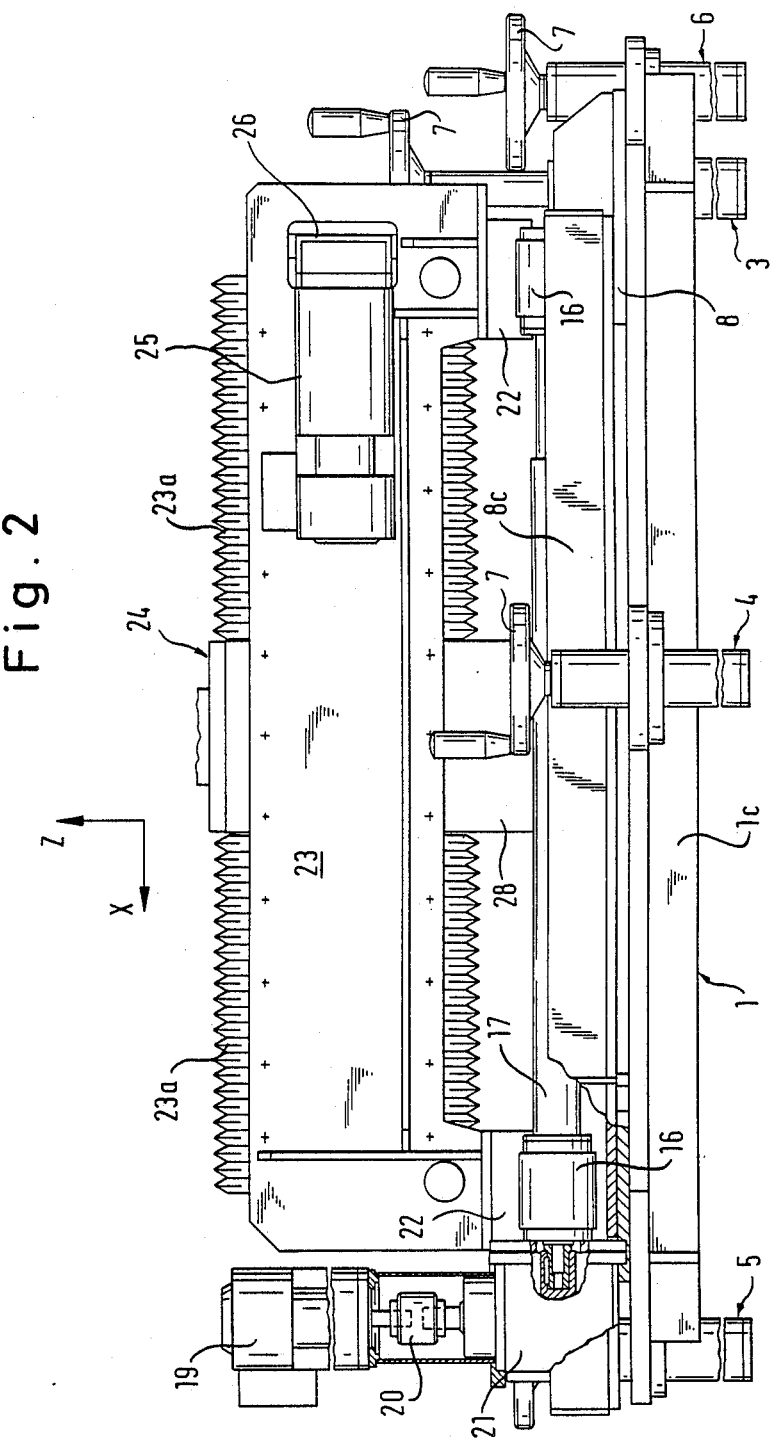

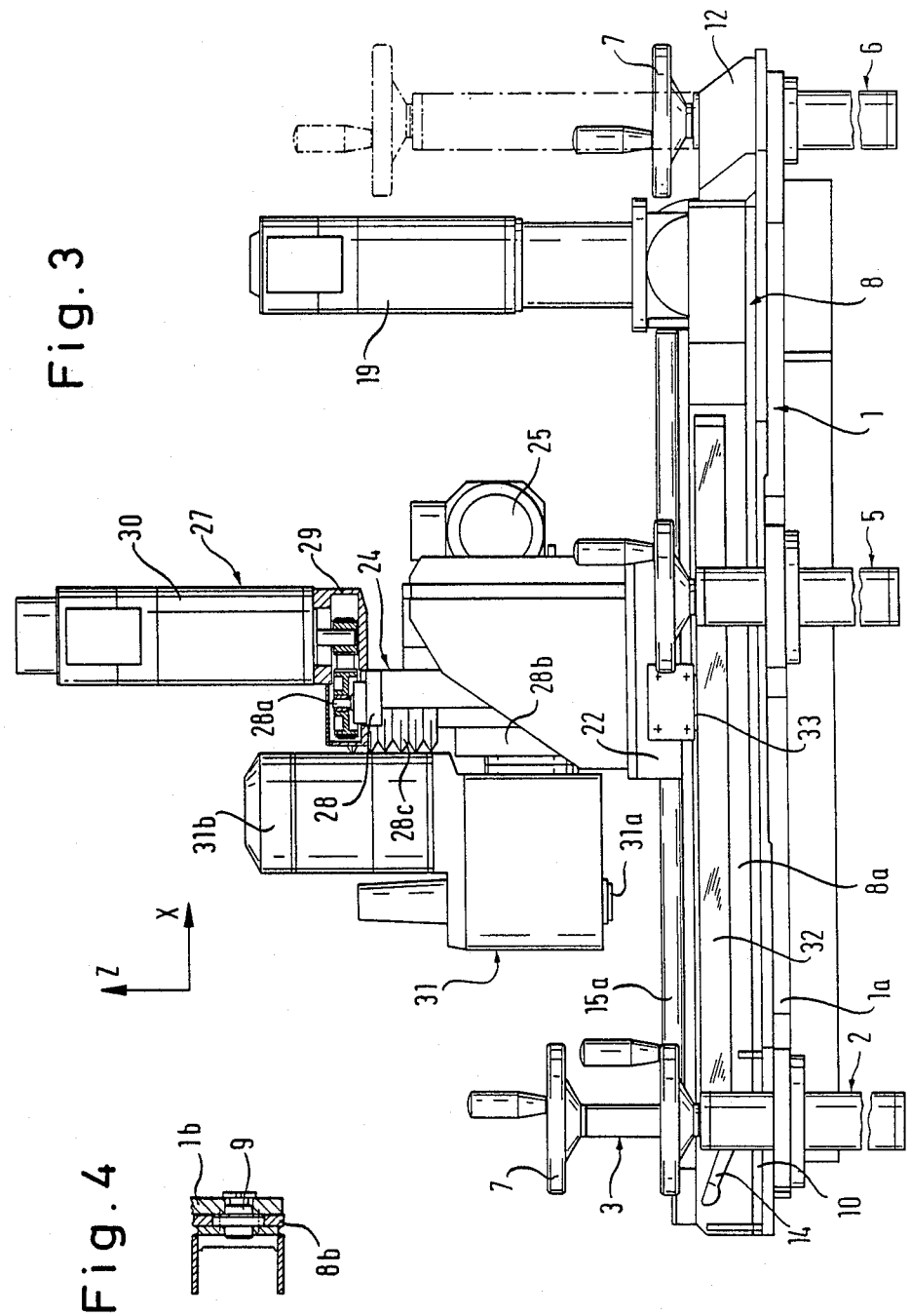

MACHINING DEVICE WITH A TOOLHOLDER DISPLACEABLE IN THREE COORDINATES PERPENDICULAR TO ONE ANOTHER

BACKGROUND OF THE INVENTION

The invention relates to a machining device with a toolholder displaceable on a frame of the device in three coordinates perpendicular to one another by means of three linear guides and associated drives.

Such machine tools are customarily mounted in a stationary fashion, and the article to be machined is transported to the machining device. However, there is a need for machining devices that can be transported to the article to be machined and can be placed in a simple manner in machining association with the article at the site where the article is located, for example machining devices that are associated with a feed pipe arranged on a boiler casing so that the free end face of such pipe can be machined.

SUMMARY OF THE INVENTION

It is therefore an object of the present invention to provide a machining device which is portable and can be placed into machining relationship with the article to be machined in a simple manner.

This object has been attained by providing that the frame of the device is of an essentially U-shaped configuration; that the toolholder, retained in a shape-mating fashion, is displaceable, on a carriage extending transversely to the legs of the frame of the device, in the first coordinate direction and the third coordinate direction, this carriage, retained in a shape-mating fashion with its ends on the legs of the frame, being displaceable along the legs in the second coordinate direction.

On account of the shape-mating mounting of the toolholder on the carriage, and of the carriage on the legs of the device frame, the machining device can be transported.

Due to the U-shaped configuration of the frame of the device, the device can be positioned above the zone of the base support to be machined or at the article to be machined in such a way that the machining surface is located in the working space defined by the two legs and their connecting section.

Preferably, the frame of the device consists of a U-shaped supporting stand and a U-shaped rotary stand wherein the rotary stand is seated slidingly on the surface of the supporting stand and is tiltably mounted in the zone of the free end of a leg in the region of the free end of the associated leg of the supporting stand, and the toolholder is mounted to be displaceable on the rotary stand in the three coordinate directions, and that mechanisms engaging the two stands are provided for the fixed mounting of the rotary stand to the supporting stand in a predetermined swivel position.

This preferred arrangement offers the great advantage that, after depositing the supporting stand on a base in one position, the rotary stand can still be swiveled. In other words, the operating range of the toolholder is not fixed by the position of the supporting stand but rather is fixed by the position of the rotary stand on the supporting stand.

In order to brace the device, it is advantageous to provide supports at least at the free ends of the legs and approximately in the center of the leg-joining section of the supporting stand, these supports extending in the direction of the third coordinate and being adjustable in their height manually or by means of a drive mechanism. By means of these three supports, the desired plane of the first and second coordinates can be adjusted safely.

In order to further secure this adjustment, it is advantageous to provide on each leg of the supporting stand additionally respectively one further adjustable support. With these further supports, the adjustment attained by the first three supports can be secured.

To additionally secure the machining device on the base, it is advantageous to equip the supports with suction feet or anchoring feet. These can be pneumatic or magnetic (compare, for example, West German application P No. 36 17 326.6-15 published Nov. 26, 1987 as DE-OS No. 36 17 326.)

An especially secure displacement of the carriage along the legs is achieved if the free ends of the carriage are in driving engagement with two spindles extending along the legs of the rotary stand, these spindles being drivable in synchronism.

The spindles can each have individual drive mechanisms synchronized with each other. However, it is preferred that the spindles be coupled with each other by way of reversing gears and a shaft coupling the two gears with each other and extending along the connecting section of the legs, and that the spindles be drivable by way of a drive motor associated with one of the gears.

In order to improve the transporting properties, it is advantageous to provide that the spindle drive mechanism is arranged at the fixed end of the one leg of the rotary stand, and that the drive mechanism for the movement of the toolholder in the direction of the first coordinate along the carriage is arranged at the end of the carriage displaceable on the other leg of the rotary stand. In this way, a more uniform weight distribution on the frame of the device is achieved since the drive mechanisms contribute not insubstantially to the weight of the machining device. The toolholder proper is located, in the transporting position, in the center of the carriage, i.e. approximately in the middle between the two legs of the rotary stand. The latter, in turn, is located, in the transporting position, preferably in the swivel position wherein the two U-shaped stands exhibit essentially the same orientation.

An especially simple coverage of the displacement path in the direction of the first coordinate is obtained if a measuring ruler extends along one leg of the rotary stand, which ruler can be scanned by a measuring value pickup arranged on one end of the carriage.

A tool assembly including a tool spindle and a rotary tool drive can be arranged on the toolholder in such a way that the tool axis extends in the direction of the third coordinate.

However, it is also possible for the tool assembly to be arranged on the toolholder so that the axis of rotation of the tool extends in the direction of the second or first coordinate.

In order to facilitate the engagement of lifting means at the portable machining device, it may be advantageous to provide at the supporting stand a manipulating handle extending between the legs of the supporting stand and being pivotably articulated to these legs.

Especially simple arrangements for the fixation of the rotary stand are obtained if such arrangements consist of circular-arc slots in the rotary stand and of locking bolts extending through these slots and engaging into the supporting stand.

Of course, the drive mechanisms and limit switches associated with the movement directions are connected, in the usual way, with a machine tool control apparatus.

BRIEF DESCRIPTION OF THE FIGURES

The invention is now to be described in greater detail with reference to the appended figures wherein:

FIG. 1 is a plan view of the machining device (X, Y-plane);

FIG. 2 is a lateral view (X, Z-plane);

FIG. 3 is a further lateral view (Y, Z-plane); and

FIG. 4 is a partial section along line IV—IV in FIG. 1.

DETAILED DESCRIPTION

The device according to this invention comprises a U-shaped supporting stand 1 with two legs 1a and 1b and a connecting section 1c joining these legs. Vertically adjustable supports 2, 3 and, respectively, 4 are arranged at the free ends of the legs 1a and 1b, as well as approximately in the middle of the connecting section 1c, these supports making it possible to effect adjustment of the level and alignment of the supporting stand 1 to a base support. For securing this adjustment, additional, vertically adjustable supports 5 and 6, respectively, are provided—as can be seen especially from FIG. 1—on the legs 1a and 1b. In the illustrated embodiment, the supports are adjustable by turning handwheels 7 at their upper ends.

On the planar surface of the supporting stand 1, a U-shaped rotary stand 8 is supported in a sliding and swivelable fashion. The U-shaped supporting stand 8 consists of two legs 8a and 8b and a connecting section 8c joining same. By means of a swivel bolt 9 (see FIG. 4, in particular), which bolt extends through the free ends of the two legs 1b and 8b, the swivel-type engagement is created.

Tongues 10, 11, 12 and 13 are formed at the supporting stand 8 to fix a set swivel position; these tongues pertain to the sliding surface of the supporting stand. Arcuate slots 10a, 11a, 12a and 13a are formed in the tongues and are oriented toward the swivel axle 9. Each of these slots is penetrated by a locking bolt 14 engaging into corresponding partial zones of the supporting stand and equipped with a handle.

Spindle drives 15, known per se, are provided on the legs 8a and 8b and extend in parallel to the latter; these spindle drives exhibit two guide rods 15a and 15b with a circular cross section and a covered spindle 15c shown merely schematically.

At their ends at the bottom in FIG. 1, the spindles are joined to reversing gear mechanisms 16 which, in turn, are rigidly coupled by means of a shaft 18 arranged in a protective tube 17 and extending along the connecting section 8c.

The legs 8a and 8b extend in the Y-direction whereas the shaft 18 extends in the X-direction.

A drive motor 19 is in driving connection with the reversing gear 16 associated with the leg 8a by way of a clutch 20 and a reduction gear 21 as shown in FIG. 2. The motor extends essentially in the direction of the third coordinate Z.

Two carriage supports 22 are connected to the spindles 15c and the guide rods 15a and 15b in a driving engagement and so that displacement is possible. The two carriage supports 22 carry a carriage 23 extending in parallel to the connecting section 8c; the carriage, in turn, carries a toolholder 24 displaceable along the carriage. The toolholder 24 is, in turn, held in a shape-mating way and is driven by way of a spindle, not shown. The spindle is displaced in the X-direction by a drive motor 25 with the interposition of a reduction gear 26.

The toolholder 24 includes a drive assembly 27 for movement in the Z-direction, displaceable in its entirety in the X-direction along the carriage. This drive assembly consists of a spindle arrangement 28 with a spindle 28a driven by way of a reduction gear 29 and a drive motor 30.

The assembly consisting of the carriage 23 with the spindle extending in the longitudinal direction of the carriage and of the spindle arrangement 28 is available from the firm Foehrenbach AG, Tannenwiesenstrasse 3, CH-8570 Weinfelden, Switzerland, under product No. SS 200.920.600; R 18×5 GG 26, so that there is no need for a more detailed description. The spindle arrangements 15 are likewise obtainable and are sold by the above company under product No. SS 200.420.150; R 18×5 GG 26. The spindle arrangement 28 also includes a base plate 28b to which is mounted a tool assembly 31 with a tool spindle 31a and a drive motor 31b.

In the illustrated embodiment (see particularly FIG. 3), the axis of the tool extends in the Z-direction. It is also possible, with the interposition of an intermediate plate, not shown, to attach the assembly 31 to the base plate 28b in such a way that the tool axis, for example the milling cutter axis, extends perpendicularly to the Z-direction, i.e. in the X-Y-plane.

In this context, there is a choice between X-direction or Y-direction.

A measuring ruler 32 is arranged on the leg 8a and can be scanned by a measuring value pickup 33 carried with the associated carriage support 22.

As can be seen, in particular, from FIGS. 1 and 2, the drive motor 25 with gear mechanism 26 is arranged at the end of the carriage 23 associated with the leg 8b whereas the drive mechanism 19 with associated clutch and gear 21 is associated with the lower end of the leg 8a. In the transporting position, the carriage is moved back into its position at the bottom according to FIG. 3 so that there can be a certain balancing between the weights 19 and 25. If, then, eyelets for a carrying handle are provided at the points 34 shown in dashed lines at the legs 1a and 1b, the device can be transported with a balanced weight distribution to its usage site. Thereafter, the supporting stand 1 is placed on the base support so that, for the arrangement illustrated in FIG. 1, the operative range of the tool is between the legs. By operating the supports 2, 3, 4, a height alignment of the supporting stand 1 takes place. The thus-obtained alignment is secured by adjusting the supports 5 and 6. Then, after releasing the pivoting levers 14 the rotary stand 8 is aligned—if necessary—on the supporting stand 1. After adjusting the desired angular position, the rotary stand 8 is secured on the supporting stand 1.

Thereafter, the drive mechanisms and the limit switches, not shown, are connected by way of a plug-in connection with the control device, not illustrated, and the portable machining tool is in its ready-for-use condition.

If the tool assembly 31 is attached so that the tool extends, for example, in the Y-direction, it is also possible to work, with the portable machining tool, in the X,Z-plane, in front of which the machining device is arranged.

The displacement means of the carriage 23 and, respectively, of the assembly 28 are protected by protective bellows 23a and 28c, respectively, against the entrance of dust or machining chips.

The vertically adjustable supports 2, 3, 4, 5, 6 cna be of differing types of construction, but preferably the supports are used as sold by the firm Rose and Krieger, Zum Industriehafen 21, 4950 Minden, model number EWTH 40/500-7.2400506.2110.

The machine can be utilized in arbitrary spatial positions if its supports are provided, in the manner indicated above, with suction or retaining means. Among such means can also be a separate support structure not connected with the workpiece.

We claim:

1. A portable machining device including a toolholder (24) displaceable in three coordinates (X, Y, Z) perpendicular with respect to one another by means of three linear guides (23, 15, 28) and associated drives (25, 19, 30) on a frame of the device, characterized in that the frame (1, 8) of the device is of an essentially U-shaped configuration having two parallel legs and a section connecting said legs, whereby the device may be selectively positioned adjacent the article to be machined in such a way that the surface to be machined is located in the working space defined between said legs and section; that the toolholder (24), retained in a shape-mating fashion, is displaceably mounted on a carriage (23) which extends transversely to the legs (1a, 8a; 1b, 8b), the toolholder being movable on the carriage in the first coordinate direction (X) and the third coordinate direction (Z), the carriage being retained in a shape-mating fashion with its ends (22) mounted on the legs (1a, 8a; 1b, 8b) of the frame and being displaceable along the longitudinal extents of the legs in the second coordinate direction (Y).

2. Device according to claim 1, characterized in that supports (2, 3, 4) are provided at least at the free ends of the legs (1a, 1b) and approximately in the middle of the leg-connecting section (1c) of the supporting stand (1), these supports extending in the direction of the third coordinate (Z) and being adjustable in their height by one of manual operation and drive mechanisms.

3. Device according to claim 2, characterized in that one further, adjustable support (5, 6) is additionally provided on each leg (1a, 1b) of the supporting stand (1), respectively.

4. Device according to claim 3, characterized in that the supports are equipped with one of suction and anchoring feet.

5. Device according to claim 1, characterized in that a tool assembly (31) including a tool spindle (31a) and a tool drive mechanism (31b) is arranged on the toolholder (24) in such a way that the tool axis extends in the direction of the third coordinate (Z).

6. A machining device including a toolholder (24) displaceable in three coordinates (X, Y, Z) perpendicular with respect to one another by means of three linear guides (23, 15, 28) and associated drives (25, 19, 30) on a frame of the device, characterized in that
 (a) the frame of the device includes
  (1) a U-shaped supporting stand (1) having two parallel legs and a section connecting said legs; and
  (2) a U-shaped rotary stand (8) slidably seated on the surface of the supporting stand and tiltably supported in the zone of the free end of an associated leg of said supporting stand (1);
 (b) the toolholder (24), retained in a shape-mating fashion, is displaceably mounted on a carriage (23) which extends transversely to the legs (1a, 8a; 1b, 8b), the toolholder being movable on the carriage in the first coordinate direction (X) and the third coordinate direction (Z), the toolholder further being arranged on the rotary stand (8);
 (c) the carriage being retained in a shape-mating fashion with its ends (22) mounted on the legs (1a, 8a; 1b, 8b) of the frame and being displaceable along the longitudinal extents of the legs in the second coordinate direction (Y), whereby the toolholder is displaceable in three coordinate directions; and
 (d) means engaging the two stands (1, 8) are provided for fixing the rotary stand (8) on the supporting stand (1) in a predetermined swivel position.

7. Device according to claim 6, characterized in that the free ends (22) of the carriage (23) are in driving engagement with two spindles (15c) extending along the legs (8a, 8b) of the rotary stand (8), these spindles being drivable in synchronism.

8. Device according to claim 7, characterized in that the spindles (15c) are coupled with each other by way of reversing gears (16) and a shaft (18) which latter couples the two gears (16) with each other and extends along the connecting section (8c) of the legs (8a, 8b), and the spindles (15c) are drivable by way of a drive motor (19) associated with one of the gears (16).

9. Device according to claim 8, characterized in that the spindle drive (19) is arranged at the fixed end of said one leg (8a) of the rotary stand (8), and the drive mechanism (25) for moving the toolholder (24) in the direction of the first coordinate (X) is arranged along the carriage (23) at the end of the carriage which is displaceable on the other leg (8b) of the rotary stand.

10. Device according to claim 6, characterized in that a measuring ruler (32) extends along said one leg of the rotary stand (8), which ruler can be scanned by a measuring value pickup (33) arranged at one end of the carriage (23).

11. Device according to claim 6, characterized in that the means for fixing the rotary stand (8) in position consist of circular-arc slots (10a–13a) in the rotary stand (8) and of locking bolts (14) extending through these slots and engaging into the supporting stand (1).

* * * * *